United States Patent [19]
Willson et al.

[11] Patent Number: 5,249,463
[45] Date of Patent: Oct. 5, 1993

[54] MEASUREMENT OF LIQUID LEVEL

[75] Inventors: Jolyon P. Willson, Andover; Paul N. Richards, Chineham, both of England

[73] Assignee: Schlumberger Industries Limited, Farnsborough, England

[21] Appl. No.: 947,846

[22] Filed: Sep. 21, 1992

[30] Foreign Application Priority Data

Sep. 26, 1991 [GB] United Kingdom ............. 9120511

[51] Int. Cl.$^5$ ............................................. G01F 23/28
[52] U.S. Cl. ........................... 73/290 R; 73/304 R; 324/643
[58] Field of Search ............... 73/290 R, 329, 304 R; 324/643

[56] References Cited

U.S. PATENT DOCUMENTS

| | | | |
|---|---|---|---|
| 3,358,510 | 12/1967 | Hoffmann et al. | 73/329 |
| 3,424,002 | 1/1969 | Johnson | 73/290 R |
| 3,474,337 | 10/1969 | Petrick | 73/290 R |
| 3,703,829 | 11/1972 | Dougherty | 73/290 R |
| 3,832,900 | 9/1974 | Ross . | |
| 3,853,005 | 12/1974 | Schendel . | |
| 4,566,321 | 1/1986 | Zacchro | 73/290 R |
| 4,934,186 | 6/1990 | McCoy | 73/290 V X |

FOREIGN PATENT DOCUMENTS

| | | |
|---|---|---|
| 0244033 | 11/1987 | European Pat. Off. . |
| 1144345 | 3/1969 | United Kingdom . |
| 1149654 | 4/1969 | United Kingdom . |
| 1427271 | 3/1976 | United Kingdom . |
| 1448282 | 9/1976 | United Kingdom . |

Primary Examiner—Daniel M. Yasich
Attorney, Agent, or Firm—Sanford J. Asman

[57] ABSTRACT

A water level measurement system for use with a pressurized power plant boiler comprises a tubular pressure vessel for attachment to one end of the boiler such that the water level in the pressure vessel is the same as in the boiler. The pressure vessel has a central rod-like conductor which together with the vessel forms a coaxial RF waveguide. A pair of spaced reference discontinuities are provided in the conductor above the maximum level of the water, so that an RF pulse injected into the waveguide is reflected successively by both discontinuities and the surface of the water. The level of the water can then be determined independently of changes in the dielectric constant of the vapor above it, from the ratio between the time intervals between the first and second reflected pulses and between the first and third reflected pulses. The conductor is mounted at the top of the pressure vessel by way of a pressure seal and a ceramic insulator.

6 Claims, 1 Drawing Sheet

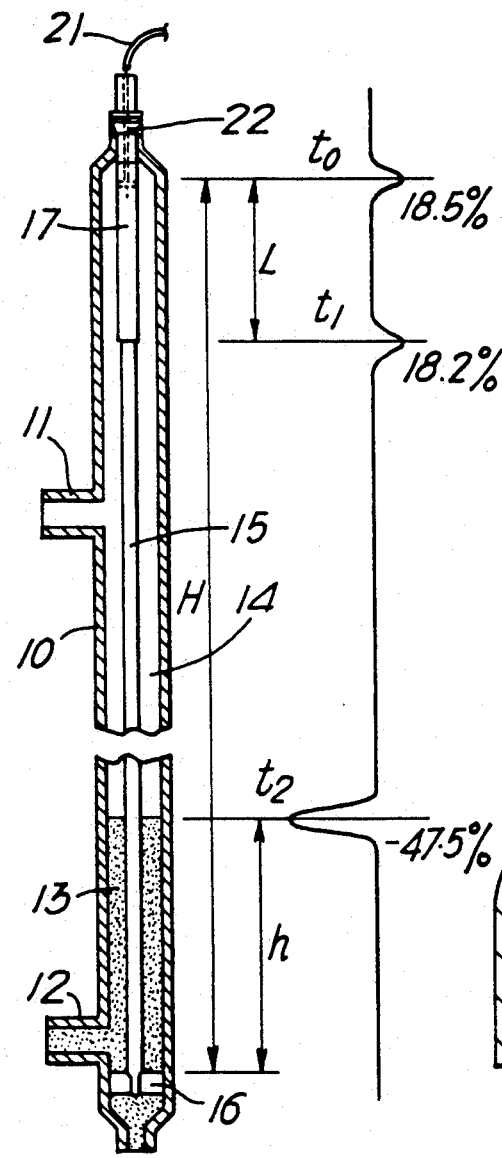
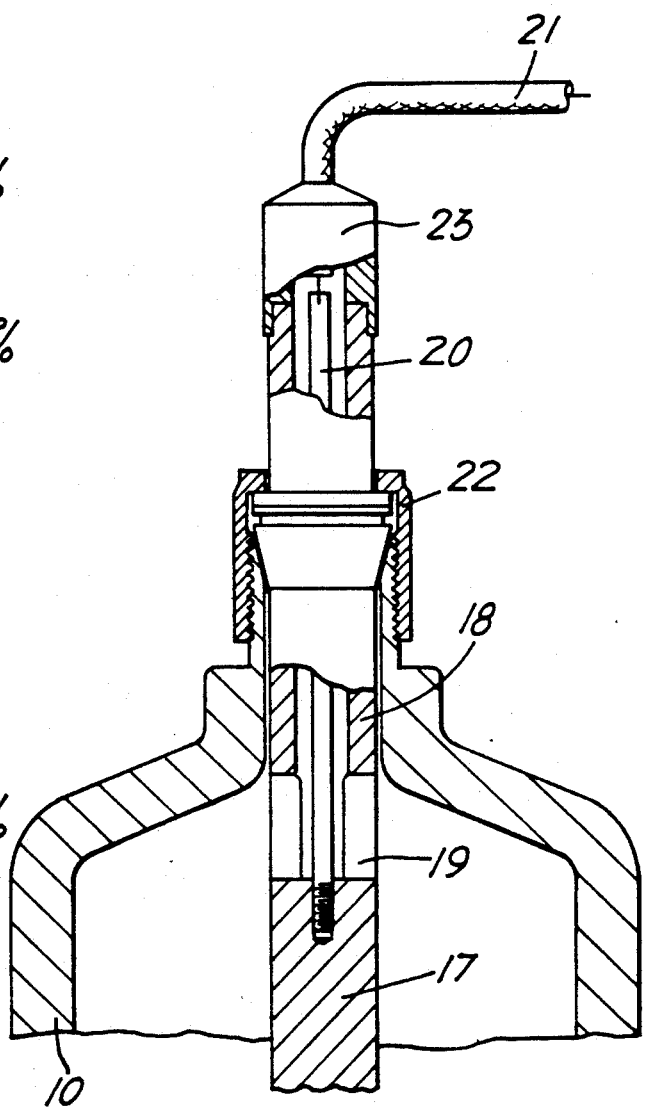

MEASUREMENT OF LIQUID LEVEL

The present invention relates to the measurement of liquid level, for example in a tank or pressure vessel, and is particularly, though not exclusively, concerned with the problems of measurement of liquid level under conditions of high temperature and pressure.

Changes in water level in power plant boilers are commonly monitored indirectly by means of devices which are affected by the density and temperature of the water and which are thus prone to error. The existing devices are reliable but do not give adequate resolution, especially when a wide range of levels may occur.

The present invention proposes the measurement of the liquid level directly by means of time-domain reflectometry using a short R.F. pulse which is reflected from the surface of the liquid. The method of the invention thus comprises determining the time of travel of a pulse between a reference position and the point at which it is reflected from the surface of the liquid. The reference position can be a discontinuity from which the pulse is also reflected so that the distance from the reference position to the surface is measured by the time interval between the reflected pulses.

The invention provides a liquid level measurement device having inner and outer probe conductors separated by a dielectric gap which is filled by the liquid up to the level to be measured and above that level by the gas or vapour over the liquid, a coaxial feeder for applying an R.F. pulse to the upper end of the probe, the probe presenting a first discontinuity nears its upper end for producing a reference reflected pulse, and circuitry coupled to the probe for calculating from the reference pulse and the reflected pulse from the liquid surface the distance between the surface and the first discontinuity.

Where changes in the gas or vapour over the liquid are likely to cause significant variations in the speed of travel of the pulses it is necessary to provide for measurement of the speed of travel so that the distance can be accurately determined. Preferably, this is done by constructing the probe to have a second reflecting discontinuity below the first but still in the gas or vapour zone above the maximum level of the liquid. Since the reflected pulse from the second discontinuity is travelling under the same conditions as that from the liquid surface the distances from the first discontinuity are directly proportional to the measured time of travel.

In the application of the invention to the measurement of liquid levels in a boiler, a column is provided which is coupled to the boiler at two different levels so that the liquid enters the column and rises to the same level as in the boiler. The pressure-retaining shell of the column forms the outer conductor of the probe and the inner conductor is supported along the axis of the column and is connected through a pressure seal at the upper end of the column to the coaxial feeder.

The invention will now be described in more detail with the aid of an example illustrated in the accompanying drawings, in which:

FIG. 1 is a vertical section of a measuring device in accordance with the invention for monitoring liquid level in a pressurized boiler; and FIG. 2 is a detail on a larger scale of the upper end of the device showing the construction of the pressure seal.

As shown in FIG. 1 the device comprises a column which is mounted vertically and has an outer, tubular, pressure-retaining steel shell 10 which is connected by couplings 11 and 12 with the interior of the boiler so that the water 13 rises to the same level in the column as in the boiler and the space 14 above the water 13 is filled with pressurized steam. A steel rod 15 is mounted coaxially within the tubular shell 10, being supported at its lower end by a locating ring 16 and attached at its upper end to a titanium rod 17. The rod 15 is a sliding fit in the locating ring 16, which constitutes an RF short circuit between the rod 15 and the shell 10, and is a screw fit into the bottom of the rod 17 to facilitate disassembly for transportation.

As shown in FIG. 2 the upper end of the rod 17 is coupled to a titanium tube 18 by an aluminium oxide ceramic collar 19 which is brazed to the rod 17 and tube 18, e.g. as described in United Kingdom Patent Application No. 2,173,138. A stainless steel pin 20 passing through the collar 19 and the tube 18 forms the electrical connection from the rod 17 to the inner conductor of a coaxial feeder 21. The tube 18 is coupled by a Wadelock pressure seal 22 to the shell 10 and at its upper end is connected by a cap 23 to the outer conductor of the coaxial feeder 21. A Wadelock seal is a well known form of dual-ferrule metal-to-metal seal between two suitably tapered surfaces (i.e., no separate sealing washer is required): another form of such seal is a swage-lock seal, which could also be used if desired.

The tube 18 and the pin 20 with the air gap between them are dimensioned to have the same coaxial impedance as the feeder 21. However at the ceramic collar 19 there is a change of impedance, i.e., a first reflecting discontinuity, which results in reflection of a transmitted pulse. A second reflecting discontinuity is at the junction of the rod 17 and the rod 15 (FIG. 1). The next reflection is at the surface of the water 13 and a bottom reflection is obtained from the ring 16 which provides a virtual short-circuit for R.F. pulses. As shown in FIG. 1, when an R.F. pulse is transmitted down the column the reflection from the first discontinuity at time t0 is a positive pulse with a reflection coefficient of approximately 18%. The second discontinuity at a distance L from the first will normally give a similar reflection at time t1. The water surface at height h gives a negative reflected pulse with a reflection coefficient of 47.5% at time t2. If there is no water in the column a large negative pulse is received from the bottom ring 16. Conversely if the water rises above the steam branch 11 and swamps the reference reflection from the second discontinuity the second reflection will be large and negative instead of small and positive.

It will be seen that the height of the water level can be calculated from the equation $$h = H - \frac{t2 - t0}{t1 - t0} L$$

The result is therefore independent of the velocity of the pulses providing that they all travel in a region where the dielectric is the same steam or vapour under the same conditions of temperature and pressure.

The transmitted pulses are R.F. pulses of approximately 1 nanosecond pulse width. The echo waveform does not consist purely of the reflected pulses described but requires analysis by appropriate circuits to extract the reflected pulses of interest before carrying out the calculation of the liquid level.

The distance, h', between the surface of the liquid and the first discontinuity is determined by the external circuitry 30, shown in FIG. 1, as part of the calculation which is performed in accordance with the formula shown above. First, the time t0, for the R.F. pulse to be reflected off the first discontinuity, i.e., at the ceramic collar 19, is measured. Next, the time, t1, for the R.F. pulse to be reflected off the second discontinuity, i.e., at the junction of the rod 17 and the rod 15, is measured. Finally, the time, t2, for the R.F. pulse to be reflected off the surface of the liquid 13, is measured. Using the known distance, L, between the first and second discontinuities, and the difference between the times, t1 and t0, the velocity of the R.F. pulse through the vapor above the surface of the liquid is, $v = L/(t1-t0)$. Since the distance from the first discontinuity to the surface of the liquid is given by $h' = v(t2-t0)$, and since $v = L/(t1-t0)$, the distance $h' = L(t2-t0)/(t1-t0)$. As shown in the formula set forth above and in FIG. 1, the distance, H, corresponding to the length of the tube is known. Consequently, the level, h, of the liquid 13 is determined in accordance with the formula set forth above in that $h = H - h'$. Accordingly, $h = H - L(t2-t0)/(t1-t0)$ as shown above.

We claim:

1. A liquid level measurement device having upper and lower ends and comprising inner and outer probe conductors separated by a dielectric gap which is filled by a liquid up to a level to be measured and above that level by a gas or vapor, a coaxial feeder for applying R.F. pulses to the upper end of said probe for reflection at the surface of said liquid, said probe having a first discontinuity near its upper end for producing a first reference reflected pulse in response to each R.F. pulse and a second discontinuity below said first discontinuity but in said gas or vapor and above the normal maximum level of said liquid for producing a second reference reflected pulse in response to each R.F. pulse, and circuitry coupled to said probe for determining from the time differences between the reference reflected pulses and the pulse reflected from the surface of said liquid the distance between the surface of said liquid and said first discontinuity.

2. The device of claim 1, in which said outer probe conductor is in the form of a pressure-retaining shell with couplings at two levels for connection to a container for liquid whose level is to be monitored so that the level of said liquid in said shell is the same as that in said container, and said inner conductor is connected to said coaxial feeder through a pressure seal at said upper end of said probe.

3. The device of claim 2, in which said inner conductor is supported within said shell by a locating ring at said lower end of said probe.

4. The device of claim 2, in which said inner conductor is insulated from said outer conductor by an insulating collar at said upper end and is connected to said inner conductor of said coaxial feeder by means of a pin passing through said insulating collar and said pressure seal with an air gap around said pin.

5. A liquid level measurement device for measuring the liquid level in a boiler, the device comprising a generally tubular pressure vessel having upper and lower ends with couplings for connection to said boiler at two levels such that the liquid level in said pressure vessel is the same as that in said boiler, said pressure vessel forming the outer conductor of a measurement probe whose inner conductor is mounted coaxially within said pressure vessel, a coaxial feeder connected to external circuitry for supplying R.F. pulses and performing calculations, said external circuitry being attached to said probe using a pressure seal, said coaxial feeder being used for applying R.F. pulses to said upper end of said probe, and said external circuitry being used to determine the liquid level within said probe from the time of travel of said pulse which is reflected from the surface of said liquid.

6. The device of claim 1, wherein the distance from said first discontinuity to the bottom of said liquid within said device is given by H, and wherein the distance from said first discontinuity to said second discontinuity is given by L, and wherein the distance measured from said first discontinuity to the surface of said liquid is given by h', said device further comprising means for subtracting h' from H to determine the level of said liquid, h, within said device.

* * * * *